United States Patent Office 3,373,208
Patented Mar. 12, 1968

3,373,208
CEDROL ETHERS
Jack H. Blumenthal, Oakhurst, N.J., assignor to International Flavors & Fragrances Inc., New York, N.Y., a corporation of New York
No Drawing. Filed May 20, 1966, Ser. No. 551,535
5 Claims. (Cl. 260—611)

This invention relates to aliphatic ethers of cedrol and to processes for preparing same.

Cedrol is a sesquiterpene alcohol which occurs naturally and is readily available. It has the empirical formula $C_{15}H_{26}O$. Its structural formula is:

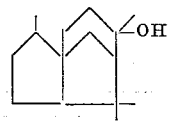

The invention comprises the novel products as well as the novel processes and steps of processes according to which such products are manufactured, the specific embodiments of which are described hereinafter by way of example, and in accordance with which I know prefer to practice the invention.

I have found in accordance with my invention that the lower aliphatic ethers of cedrol have rich, amber odors which are useful as perfumes which may be prepared by the methods given below.

The cedrol ethers of my invention are various lower aliphatic ethers of cedrol such as the methyl, ethyl, propyl, allyl, butyl and methallyl ethers of cedrol. These materials may be illustrated by the structural formula

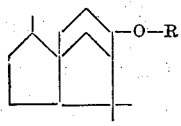

wherein R is methyl, ethyl, propyl, butyl, allyl or methallyl.

As I now prefer, I carry out my invention for the production of cedrol ethers by reacting an alkali metal derivative of cedrol with an alkyl or alkenyl halide or with a neutral sulfuric acid ester such as dimethyl or diethyl sulfate, or with an alkyl ester of an aryl sulfonic acid.

The following are examples of the cedrol ethers and methods of preparing same as I now prefer to practice my invention. It is to be understood that these examples are illustrative of the invention, and the invention is not to be considered as restricted thereto except as indicated in the appended claims.

Example I

To a refluxing mixture of 575 g. xylene and 164 g. of sodium hydride (54% suspension in mineral oil) was added a solution of 575 g. of cedrol (recrystallized) in 2875 ml. of dry xylene. The mixture was refluxed until gas evolution ceased. To the refluxing mixture was added 253 g. of dimethyl sulfate over a period of 30 minutes. The mixture was refluxed for another seven hours. After cooling, the reaction mass was poured into a solution of 285 g. of water and 100 g. of 50% aqueous sodium hydroxide. The oil layer was separated and washed neutral with water. The solvent was stripped off to yield 640 g. of crude cedryl methyl ether. GLC indicated one peak with the absence of the starting alcohol. Fractionation yielded 577 g. of cedryl methyl ether, representing a yield of 94%. Analysis for —$OCH_3$; found: 13.02%; theory: 13.12.

B.P. 96° C./1 mm., $n_D^{20}$ 1.4957, $d_{20}$ 0.9762

This material is useful as a perfume, and has an amber-woody odor.

Example II

To a mixture of 200 g. of dry xylene and 57 g. of sodium hydride (54% suspension) at reflux was added a solution of 222 g. of recrystallized cedrol in 1000 g. of dry xylene. The reaction mixture was refluxed for two hours, and 169 g. of allyl bromide was dropped in at reflux over 30 minutes. The reaction mixture was refluxed for another three hours, cooled and poured into water. The oil layer was separated and washed with water and the solvent distilled off under vacuum. The residue was rushed-over. The distillate weighed 200 g. and GLC indicated one major (80%) and one minor peak (20%). The minor peak had the same retention time as cedrol. (85% yield based on cedrol which reacted.) Fractionation yielded cedryl allyl ether.

B.P. 95° C./0.7 mm., $n_D^{20}$ 1.4981, $d_{20}$ 0.9715

This material is useful as a perfume, and has a woody-amber odor with a fruity nuance.

Example III

Pure cedryl allyl ether (56 g.) prepared as in Example II was hydrogenated in isopropanol at 40 p.s.i. at 25 to 30° C. using 5% palladium on carbon as catalyst. The crude product, after filtration and stripping of the solvent weighed 50 g. GLC indicated one peak. IR showed the absence of any vinyl absorption. The yield was 89%. Distillation yielded cedryl propyl ether.

B.P. 108° C./mm., $n_D^{20}$ 1.4888, $d_{20}$ 0.9562

This material is useful as a perfume, and has a woody-amber odor with an ionone nuance.

Example IV

To a refluxing mixture of 200 ml. of heptane and 50 g. of sodium hydride (54% dispersion) was added a solution of 214 g. of recrystallized cedrol in 800 ml. of heptane over a period of one hour. The reaction mixture was refluxed for another 1.5 hours and 154 g. of diethyl sulfate added over a 45 minute period. After refluxing for another 4 hours, the mixture was cooled and poured into 200 g. of ice and 50 g. of 50% sodium hydroxide solution. The oil layer was separated, washed once with water and the solvent stripped off. The residue weighed 250 g. and GLC (two peaks) indicated the presence of about 25% of unreacted cedrol. The yield was 75% (based on cedrol which reacted). Fractionation yielded cedryl ethyl ether.

B.P. 114° C./1.2 mm., $n_D^{20}$ 1.4910, $d_{20}$ 0.9608

This material is useful as a perfume and has a woody-amber odor.

The following is an example of a perfume formula embodying cedryl methyl ether and producing a perfume having a woody-amber fragrance:

Example V

| | |
|---|---:|
| Bergamot oil CP | 100 |
| Orange oil fla. CP | 100 |
| Bitter orange oil WI | 50 |
| Lemon oil cal. CP | 20 |
| Mandarin oil | 20 |
| Lime oil exp. WI | 10 |
| Ocimene | 10 |
| Ortho tertiary butyl cyclohexanyl acetate | 10 |
| Cedryl methyl ether | 50 |
| | 370 |

The NMR data concerning the above ethers are given below:

Proton count is based on assigning theoretical number of protons to "up-field" signals. Spectrum was measured in CCl₄ solution at 60 MHz. on Varian A-60 spectrometer. Chemical shift is expressed in p.p.m. from TMS, used as an internal standard. Signal multiplicities are expressed as s. (singlet), d. (doublet), t. (triplet), q. (quartet) and m. (multiplet).

CEDRYL METHYL ETHER

| | Δ (p.p.m.) | No. of protons |
|---|---|---|
| CH₃—O— | 3.12 (s.) | 3.2 |
| CH₃—C—O— | 1.24 (s.) | 3.0 |
| Gem-dimethyl | 1.17 (s.) / 1.00 (s.) | 5.7 |
| H<br>CH₃—C— | 0.85 (d.) | 3.2 |
| —CH₂— + HC⟨ | 2.0–1.26 (m.) | 13.4 |

CEDRYL PROPYL ETHER

| | | |
|---|---|---|
| —CH₂—O— | 3.25 (t.) | 1.9 |
| CH₃—C—O— | 1.23 (s.) | 2.7 |
| Gem-dimethyl | 1.17 (s.) / 0.90 (t.) | |
| CH₃—CH₂— | 0.90 (t.) | 11.7 |
| H<br>CH₃—C— | 0.83 (d.) | |
| —CH₂— + HC⟨ | 1.95–1.25 | 15.2 |

CEDRYL ETHYL ETHER

| | | |
|---|---|---|
| CH₃—CH₂—O— | 3.55 (q.) | 1.8 |
| —CH₂— + HC⟨ | 2.15–1.25 (m.) | 12.7 |
| CH₃—C—O— | 1.25 (s.) | 3.2 |
| Gem-dimethyl | 1.17 (s.) / 1.00 (s.) | 8.9 |
| CH₃—CH₂—O— | 1.08 (t.) | |
| H<br>CH₃—C— | 0.84 (d.) | 3.0 |

CEDRYL ALLYL ETHER

| | | |
|---|---|---|
| HC=C⟨ | 6.2–5.58 (m.) | 2.7 |
| ⟩C=CH₂ | 5.32–4.95 (m.) | |
| =C—CH₂—O— | 3.85 (m.) | 1.8 |
| —CH₂— + HC⟨ | 2.0–1.28 (m.) | 11.5 |
| CH₃—C—O<br>Gem-dimethyl | 1.23 (s.) / 1.20 (s.) / 0.97 (s.) | 8.8 |
| H<br>CH₃—C— | 0.83 (d.) | 2.7 |

In the above examples sodium hydride may be replaced by sodamide in an inert solvent such as heptane or xylene.

The mass. spec. of the cedrol ethers give the following molecular weights:

| | Mol. wt. |
|---|---|
| Cedryl methyl ether | 236 |
| Cedryl allyl ether | 262 |
| Cedryl ethyl ether | 250 |

I claim:
1. A lower aliphatic ether of cedrol useful as a perfume and having the formula

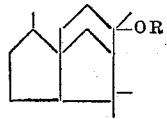

wherein R is selected from the group consisting of methyl, ethyl, propyl, butyl, allyl and methallyl.
2. The compound of claim 1 wherein R is methyl.
3. The compound of claim 1 wherein R is ethyl.
4. The compound of claim 1 wherein R is propyl.
5. The compound of claim 1 wherein R is butyl.

References Cited

UNITED STATES PATENTS 2,267,733  12/1941  Hansley _____ 260—632 X

OTHER REFERENCES

Soap, Perfumery and Cosmetics, vol. 34 (1961), pp. 743–745.

BERNARD HELFIN, *Primary Examiner.*

UNITED STATES PATENT OFFICE
CERTIFICATE OF CORRECTION

Patent No. 3,373,208                           March 12, 1968

Jack H. Blumenthal

It is certified that error appears in the above identified patent and that said Letters Patent are hereby corrected as shown below:

Column 3, first table, first column, line 4 thereof, for
$$\begin{matrix} & H \\ CH_2 & -C \end{matrix}$$
read
$$\begin{matrix} & H \\ CH_3 & -C \end{matrix}$$
same column, third table, second column, line 1 thereof, for "3.55" read -- 3.35 --; column 4, in the table, first column, line 1 thereof, for

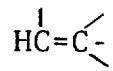            read            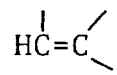

Signed and sealed this 24th day of June 1969.

(SEAL)
Attest:

Edward M. Fletcher, Jr.                     WILLIAM E. SCHUYLER, JR.
Attesting Officer                             Commissioner of Patents